Patented Mar. 25, 1952

2,590,654

UNITED STATES PATENT OFFICE 2,590,654

PRINTING INKS FROM TALL OIL MODIFIED ALKYD RESINS

Alfred F. Schmutzler, Teaneck, N. J., assignor to American Cyanamid Company, New York, N. Y., a corporation of Maine No Drawing. Application April 16, 1949, Serial No. 88,045

9 Claims. (Cl. 260—22)

1

This invention relates to printing inks and to processes for preparing the same. More specifically, it relates to a printing ink comprising a vehicle which comprises talloil-modified alkyd resins and pigment dissolved in an inert solvent.

I have discovered that these talloil modified alkyd resins in an inert solvent are excellent vehicles for printing inks and are adaptable for use with great varieties of pigments and particularly show excellent wetting properties when used with carbon-black pigment. The use of these resin solutions as vehicles for printing inks enables one to print at a greater rate of speed than ordinarily possible. Furthermore, these resin solutions are capable of very quick drying after the printing impression has been completed.

Reference is made to my copending application, Serial No. 88,044 filed April 16, 1949, entitled "Talloil Modified Alkyd Resins and Process for Preparing the Same." In that application, I have set forth the process for the preparation of these talloil modified alkyd resins per se in detail together with various modifications thereof. These resins are prepared by mixing talloil with a polycarboxylic acid and esterifying the mixture with a polyhydric alcohol and then heat reacting this resulting product with monomeric acrylonitrile or a mixture of monomeric acrylonitrile and monomeric styrene. For the purpose of completeness, the details of the processes for the preparation of these alkyd resin solutions, which are utilizable as vehicles for printing inks, will be hereinafter set forth in comparable detail.

This invention has for its object the preparation of a printing ink comprising a resin vehicle, a solvent therefor, and pigment. A further object of this invention is to produce a printing ink, which may be used in off-set, lithographic, intaglio, typographic, gravure, and rotogravure types of printing processes. Another object of this invention is to increase the speed with which printing presses may be run, especially in lithographic heat setting printing processes by use of this new printing ink. A still further object of this invention is to increase the speed of drying of printed matter by the use of these printing inks.

When the printing inks are prepared according to the process hereinbelow set forth in detail, first with respect to the preparation of the resin per se, later with respect to the formulation of the ink by combining resin, solvent and pigment, novel and unexpected results are obtained. The resin in solution, functioning as the vehicle, exhibits excellent wetting properties for carbon black pigment and for a great variety of

2 all other pigments generally known and used in the art. In order that there may be a more complete understanding of the invention, the following examples are presented which show first, the broader aspects of the process for the preparation of the resin per se, and the specific examples in detail. It must be remembered, however, that these examples are by way of illustration only and are not to be interpreted as limitations in the case. All parts are parts by weight.

Refined talloil and a polycarboxylic acid are mixed and heated for about two hours at a temperature of about 225–245° C. This talloil acid adduct or mixture is subsequently cooled to about 160° C. A polyhydric alcohol is added to the talloil acid adduct or mixture and the reagents are esterified until an acid number of 5–35 has been obtained. This reaction can be accomplished in the presence of a mutually inert solvent (i. e., a solvent which is substantially inert to all of the active components of the reaction) if desired. The esterification is then maintained until the viscosity of a 50% solution of the mixture in a high boiling aliphatic petroleum hydrocarbon of low kauri-butanol value is greater than C but less than M on the Gardner-Holdt scale. This resulting oil-modified alkyd resin is then reacted with monomeric acrylonitrile or monomeric acrylonitrile and monomeric styrene until the viscosity of a 60% resin solution in a high boiling aliphatic petroleum hydrocarbon of low kauri-butanol value of K to Z–10 on the Gardner-Holdt scale is reached.

It is not imperative that the talloil that is used in the practice of the process in this invention be the refined talloil, although that is actually preferred. Talloil generally has as principal components about 46 to 50% resin acids and about 43 to 47% of fatty acids, plus relatively small amounts (6% to 8%) of unsaponifiable materials, ash, and moisture.

The polycarboxylic acids which may be used in the practice of the process of this invention are the $\alpha,\beta$ unsaturated polycarboxylic acids and the saturated polycarboxylic acids. Amongst the former, the $\alpha,\beta$ unsaturated carboxylic acids are maleic, fumaric, aconitic and itaconic. These acids form adducts with the talloil. Amongst the saturated polycarboxylic acids which may be used are phthalic, oxalic, malonic, succinic, glutaric, sebacic, adipic, pimelic, suberic, azelaic, tricarballylic, citric, tartaric and malic. These saturated polycarboxylic acids do not form adducts with the talloil but rather engage in a purely physical mixture. The use of the $\alpha,\beta$ unsaturated polycarboxylic acids form hard resins as an ultimate result. The saturated polycarboxylic acids form softer resins than the α,β unsaturated polycarboxylic acids. It is within the intended scope of this invention to use other dicarboxylic and polycarboxylic acids and their anhydrides. The use of the term "polycarboxylic" acid is intended to include not only those acids with more than two carboxylic groups but the dicarboxylic acids and their anhydrides as well. These acids may be used singly or in combination with one another.

The use of a catalytic agent in the practice of the process of this invention will serve to increase the speed of reaction, although the absence of such catalytic agents permits the reaction to take place none-the-less. The catalytic agents which could be used in this connection are: zinc dust, acetone, cumene hydroperoxide, zinc peroxide, calcium peroxide, acetaldehyde, benzoyl peroxide, etc. These catalytic agents may be used separately or in combination with one another, and in varying proportions.

Amongst the different polyhydric alcohols that could be used in the practice of the process of this invention, such alcohols as diethylene glycol, ethylene glycol, trimethylene glycol, tetramethylene glycol, pentamethylene glycol, pinacol, arabitol, xylitol, adonitol, mannitol, dulcitol, and sorbitol, glycerol, and pentaerythritol, are a few which can be used in the practice of the process of this invention. These di- and polyhydric alcohols may be used singly or in combination with one another.

The following examples will serve to illustrate the invention in further detail but it is to be understood that the specific enumeration of detail is by way of illustration only and is not to be interpreted as a limitation in the case.

*Example 1*

1700 parts by weight of crude talloil are mixed with 98 parts by weight of maleic acid anhydride, to which a small portion of zinc dust is added for catalytic purposes. The mixture is heated gradually to about 230° C. for a two hour period, and then is cooled to 150° C. Thereupon, 250 parts by weight of pentaerythritol are added and the mixture is reheated to esterify to acid number of about 14. A portion of this talloil modified alkyd resin, approximately 200 parts by weight, are mixed with about 45 parts by weight of a high boiling hydrocarbon of low kauri-butanol value, 1 part by weight of butyl Carbitol, ½ part by weight of acetone, 0.5 part by weight of cobalt naphthenate in P-1 ink oil (containing 1.2% cobalt), 2 parts by weight of cumene hydroperoxide, ½ part by weight of zinc peroxide. The temperature of the above mixture is lowered to 55° C., and over a 15 minute period 16 parts by weight of styrene and 4 parts by weight of acrylonitrile are added. These are stirred for ½ hour and then they are heated gradually up to 250° C. and 100 parts by weight of P-1 ink oil (a high boiling aliphatic petroleum hydrocarbon of low kauributanol value) are added. The resulting resin in a solution containing 60% resin solids had a viscosity of approximately Y on the Gardner-Holdt scale, which is about equivalent to 17.6 poises. The resinous films of this resin from which the solvent is evaporated are non-tacky, hard, and transparent. The resin is especially adapted for use in printing inks, paints and lacquers.

*Example 2*

This example is the same as Example 1 except that in place of the acrylonitrile there is substituted styrene, so that instead of having 4 parts by weight of acrylonitrile and 16 parts by weight of styrene, there is a total of 20 parts by weight of styrene and no acrylonitrile added to this mixture. The resulting resin in a solution containing 60% resin solids has a viscosity of about W, which is about 11.5 poises. The film, from which the solvent is evaporated in this instance, is tacky. It can be seen from this that the substitution of a part of the monomer styrene by a portion of the monomer acrylonitrile as shown in Example 1, an improvement is obtained in the resulting resin and in the film produced therefrom. Even greater amounts of acrylonitrile may be added than the four parts by weight, and as a result, one would get faster drying and ultimately a harder film.

*Example 3*

460 parts by weight of talloil are mixed with 29 parts by weight of fumaric acid and they are reacted in the presence of about 27 parts by weight of Varsol No. 1 (a high boiling aliphatic petroleum hydrocarbon of low kauri-butanol value). These are reacted at a temperature range between 220–240° C. for 1 hour. Then the batch is cooled to 150° C. To this batch is added about 75 parts by weight of pentaerythritol and the contents are esterified until an acid number between 10 and 15 is attained. About 150 parts by weight of this resin solution are mixed with about 25 parts by weight of styrene, 5 parts by weight of acrylonitrile, ½ part by weight of acetaldehyde. These ingredients are stirred and a catalytic mixture of 2 parts by weight of a 20% solution of ditertiary-butylperoxide in cumene hydroperoxide are added and the mixture is then heated under reflux and with constant stirring gradually over an 8 hour period to 280° C. At this time the reaction product has become very viscous and has approached the gelling point. 110 parts by weight of the P-1 ink oil are then added gradually through the reflux condenser. When the mixture has become homogeneous, stirring and heating are discontinued. The viscosity of the resulting resin solution is about Z-8 on the Gardner-Holdt scale, or approximately 400 poises.

*Example 4*

450 parts by weight of crude talloil are mixed with about 30 parts by weight of maleic anhydride in 25 parts by weight of Varsol No. 1 under about the same conditions as were set forth in Example 3. Subsequently, the pentaerythritol is added in the amount of about 75 parts by weight. 150 parts by weight of this talloil modified alkyd resin are treated with 26 parts by weight of styrene, 5 parts by weight of acrylonitrile, ½ part acetaldehyde and ½ part of the catalytic mixture described in Example 3. These components are heated to a temperature range of 242–297° C. and then 110 parts by weight of P-1 ink oil are added to the resultant mixture to form a 60% resin solution. The viscosity of this resin solution is approximately Z-7 on the Gardner-Holdt scale, or approximately 250 poises.

*Example 5*

To 450 parts by weight of the crude talloil are added 75 parts by weight of phthalic anhydride in the presence of about 30 parts by weight of Varsol No. 1. Thereupon, about 90 parts by weight of pentaerythritol are added. The charge is heated gradually to about 270° C. and held at about 270° C. until the acid number of the sample is between the range of 10 and 15. To 150 parts by weight of this mixture are added 26 parts by weight of styrene, 5 parts by weight of acrylonitrile, and ½ part by weight of acetaldehyde, and ½ part by weight of the catalytic mixture set forth in Example 3. This mixture is heated gradually to 285° C. to 298° C. in a 20 hour period. Then the resin is diluted with about 110 parts by weight of P-1 ink oil and cooled. The viscosity of the resultant 60% solution is within the range of Z-5 and Z-6 on the Gardner-Holdt scale, or approximately 200 poises.

Example 6

To 1700 parts by weight of crude talloil, add about 100 parts by weight of maleic acid anhydride and about 4 parts by weight of zinc dust. These are heated gradually to about 280° C. for a period of about 2 hours and it is then allowed to cool to 150° C. 250 parts by weight of pentaerythritol are then added in the presence of about 50 parts by weight of Varsol No. 1. This mixture is heated until the acid number is 10. To 200 parts by weight of this talloil modified alkyd resin are added about 40 parts by weight of P-1 ink oil. This mixture is stirred at 90° C. until the mixture becomes homogeneous. It is then allowed to cool to 58° C. and ½ part by weight of zinc dust is added. About 1 part by weight of cobalt naphthenate in P-1 ink oil containing 1.2% cobalt is added plus 1 part by weight of Carbitol (diethylene glycol monoethyl ether), ½ part by weight of acetone, 3 parts by weight of cumene hydroperoxide. While the temperature is being maintained at about 55°–58° C., 16 parts by weight of styrene and 4 parts by weight of acrylonitrile are gradually added in a 15 minute period. This mixture is then stirred for about ½ hour at 55°–60° C. and is then heated gradually to about 250° C. in 5½ hours. 100 parts by weight of P-1 ink oil are then added at that temperature. The resulting resin solution has a viscosity of about X on the Gardner-Holdt scale, which is approximately equal to 14.5 poises.

Example 7

A resin prepared in exactly the same manner as that set forth in Example 6, with the exception that, instead of using styrene there is used in its place a greater amount of acrylonitrile, specifically about 8 parts by weight of acrylonitrile are reacted with the talloil modified alkyd resin. This mixture is treated similarly and heated to approximately the same temperature for the same temperature for the same period of time as Example 6. The resultant resin solution has a viscosity of about W on the Gardner-Holdt scale, which is approximately equal to about 10.7 poises.

The solvent tolerance of the resin shown in Example 7 in P-1 ink oil is approximately 1 in 20, whereas the solvent tolerance of the resin shown in Example 6 in P-1 ink oil is approximately 1 in 10.

Example 8

To 1700 parts by weight of refined talloil are added 82 parts by weight of maleic acid anhydride, and this is heated at 235° C.–290° C. for 2 hours, and this mixture is then cooled to 150° C. and to the mixture is added 240 parts by weight of pentaerythritol, 2 parts by weight of calcium oxide, 5 parts by weight of glacial acetic acid. The mixture is stirred for about 10 minutes and then about 1 part by weight of zinc dust is added. This mixture is heated until the acid number is within the range of 10–15. Take 200 parts by weight of this talloil modified alkyd resin and add thereto 46 parts by weight of P-1 ink oil, 1 part of butyl Carbitol (diethylene glycol monobutyl ether), ½ part by weight of zinc peroxide, ½ part by weight of acetone, about 1 part by weight of cobalt naphthenate in a P-1 ink oil solution containing 1.2% cobalt and 2 parts by weight of cumene hydroperoxide. This is accomplished at a temperature of between 55°–58° C. While maintaining this temperature, I add to the mixture 16 parts by weight of styrene and 4 parts by weight of acrylonitrile. This mixture is stirred for ½ hour at about 55°–60° C. and then is heated gradually under reflux to about 250° C. for a 5½ hour period, whereupon I add 100 parts by weight of P-1 ink oil. The resulting 60% resin solution has a viscosity of Z on the Gardner-Holdt scale, which is approximately equal to 22.7 poises.

Example 9

To 1700 parts by weight of crude talloil are added about 100 parts by weight of maleic acid anhydride and 240 parts by weight of glycerol. This mixture is esterified by heating up to about 290° C. in 13 hours and under constant stirring. When an acid number of about 13.3 has been reached, the heating and the stirring is stopped. This talloil modified alkyd resin, with a 60% solids content, in P-1 ink oil has a viscosity of about K on the Gardner-Holdt scale, which is about equivalent to 2.75 poises.

Example 10

4 parts by weight of acrylonitrile and 16 parts by weight of styrene are catalyzed by the addition of 0.5 part by weight of ditertiary butyl peroxide and the mixture is added in a one hour epriod to 200 parts by weight of the talloil modified alkyd resin prepared according to Example 9, with constant stirring at a temperature of 140–150° C. The mixture is then gradually heated further to 200° C. in a two hour period. The resultant resin is fairly soft and sticky but is soluble in P-1 ink oil. When the resin solution to which a drier (0.03% cobalt naphthenate in P-1 ink oil) has been added is applied in the form of a film and the solvent evaporated in an air circulating drying oven for one hour at 225° F., the remaining dry resin is a non-tacky solid film at room temperature.

Example 11

12 parts by weight of acrylonitrile are catalyzed by the addition of 0.5 part by weight of ditertiary butyl peroxide and are added in about one hour's time to a 200 parts by weight portion of the talloil modified alkyd resin prepared according to Example 9 at a temperature of between 140–150° C. The mixture is then heated to 179° C. in a five hour period. The resultant resin was soft and sticky but was soluble in P-1 ink oil. When the resin solution (containing the same amount of the drier used in Example 10) is evaporated to dryness as indicated in Example 10, the remaining dry resin is a non-tacky solid film at room temperature.

Example 12

200 parts by weight of the talloil modified alkyd resin prepared according to Example 9 are mixed with the following ingredients: 46 parts by weight P-1 ink oil, 0.5 part by weight zinc dust, 1 part by weight of Carbitol, 0.5 part by weight of acetone, 1 part by weight of cobalt naphthenate, and 3 parts by weight of cumene-hydroperoxide. The mixture is heated to 56° C. to which is then added 4 parts by weight of acrylonitrile and 16 parts by weight of styrene. The mixture is stirred for ½ hour at 55°–60° C. and then gradually heated to 250° C. in 5½ hours. The resultant resin solution containing 60% solids has a viscosity of M on the Gardner-Holdt scale. The resultant resin (with the same amount of drier used in Example 10) is a non-tacky solid film at room temperature after having been heated to dryness in the same manner indicated in Example 10.

*Example 13*

Add to 1700 parts by weight of refined talloil, 82 parts by weight of maleic anhydride. The refined talloil and the maleic acid anhydride are heated to 285° C. in about 2½ hours and then cooled to 180° C., whereupon 240 parts by weight of ethylene glycol are added. This mixture is esterified for 16 hours by raising the temperature gradually to 300° C. in a 13 hour period and the temperature is then held at that level for about 3 hours, until the acid number is about 14.

*Example 14*

To 200 parts by weight of the talloil modified alkyd resin prepared according to Example 13 heated to 140°–150° C. are added 12 parts by weight of monomeric acrylonitrile and 0.5 part by weight of ditertiary butyl peroxide. The gradual addition (over a two hour period at 140–150° C.) of the acrylonitrile and the catalyst to the ester mixture having been completed, the mixture is then heated gradually under reflux with constant stirring to about 200° C., which temperature is reached in about a four hour period. The resinous solution (containing 0.03% cobalt as cobalt naphthenate) when applied to a steel panel in a thin film and dried at 300° F., produces a non-tacky film in 1¾ hours drying.

*Example 15*

200 parts by weight of the talloil modified alkyd resin prepared according to Example 13 was treated with 10 parts by weight of acrylonitrile and 30 parts by weight of monomeric styrene in the presence of 0.5 part by weight of ditertiary butyl peroxide. This is accomplished by gradually adding the mixture of the monomers and the catalyst to the ester mixture in much the same manner as indicated in Example 14. In the subsequent gradual heating, a temperature of 200° C. is reached in one hour. The application of this resin containing the same amount of drier as in Example 14 to the steel panel as indicated in Example 14 produces a non-tacky film in 1¼ hours.

*Example 16*

To 200 parts by weight of the talloil modified alkyd resin prepared according to Example 13, are added 40 parts by weight of styrene in the presence of 0.5 part by weight of ditertiary butyl peroxide. The mode of addition, stirring and heating was comparable to that shown in Example 14 except that this mixture reached 200° C. in a two hour period. The dried film on the steel panel prepared in the same manner as shown in Example 14 dried to a non-tacky film in a two hour period.

*Example 17*

To 1700 parts by weight of refined talloil are added, 82 parts by weight of maleic acid anhydride. This mixture is heated for about 2 hours between 235–285° C. and then is allowed to cool to 160° C. whereupon 240 parts by weight of pentaerythritol are added and 4.5 parts by weight of zinc dust. This mixture is heated, in order to esterify the polyhydric alcohol talloil acid adduct, for about 13 hours between 260–290° C. until an acid number of about 13.5 is reached. At this point a 50% solid solution in P-1 ink oil of this alkyd oil modified resin has a viscosity of about 3.1 poises, whereas a 60% solids content in P-1 ink oil solution has a viscosity of about 13.8 poises.

200 parts by weight of the talloil modified alkyd resin prepared above was treated in each of the following examples:

| Parts by weight | 17A | 17B | 17C | 17D |
| --- | --- | --- | --- | --- |
| Acrylonitrile | 8c | 4 | 8 | 16. |
| Styrene | none | 16 | 12 | none. |
| Ditertiary butyl peroxide. | 0.5 | 0.5 | 0.5 | 0.5. |
| Dropwise addition of monomers at ° C. | 135–145 | 135–145 | 140–150 | 140–150. |
| Time required for addition. | 50 min | 55 min | 55 min | 3½ hrs. |
| Time of heating after addition. | 5½ hrs | 5½ hrs | 5½ hrs | 3 hrs. |
| Final Temperature, ° C. | 289 | 292 | 207 [1] | 135.[2] |

[1] 200° C. was reached after 2 hours, then heating was controlled to keep temperature between 200–210° C. in order to prevent discoloration of the resinous product. Discoloration seems to take place above 225° C.

[2] Acrylonitrile reacts rather slowly with the alkyd ester. Low temperature indicates that a large amount of acrylonitrile has not been reacted.

All of these resins are non-tacky, plastic masses, and are soluble in high boiling petroleum hydrocarbon oils of low kauri-butanol value. Viscosities of solutions vary with the particular hydrocarbon used; the lower the kauri-butanol value of the solvent, the more viscous is the solution. The following table will illustrate this in greater detail:

50% (17A) in Varsol #1, visc.≅Z2 (362p).
50% (17A) in P-1 ink oil, visc.≅between Z5 and Z6 (141p).
50% (17B) in Varsol #1, visc.≅between Z3 and Z4 (59p)
50% (17B) in Deo 470 oil (a high boiling aliphatic petroleum hydrocarbon), visc.≅between Z4 and Z5 (68p)
50% (17B) in 590 oil (a high boiling aliphatic petroleum hydrocarbon), 50 visc.≅between Z6 and Z7 (250p)
% (17B) in (kauri-butanol 18.5) #80 White Oil (a high boiling aliphatic hydrocarbon of low kauri-butanol value), visc.≅between Z9 and Z10 (963p)
50% (17B) in P-1 ink oil, visc.≅Z6 and Z7 (284p)
60% (17C) in Varsol #1, visc.≅Z5 and Z6 (34p)
60% (17C) in P-1 ink oil, visc.≅Z9 and Z10 (963p)
50% (17C) in P-1 ink oil, visc.≅Z1 (31p)
50% (17C) in 590 oil, visc.≅between Z7 and Z8 (455p)
50% (17C) in #80 White Oil (a high boiling aliphatic hydrocarbon of low kauri-butanol value) (kauri-butanol 18.5), visc.≅more than Z10 (3840p)
(0% (17D) in Varsol #1, visc.≅between P and Q (4.1p)
60% (17D) in P-1 ink oil, visc.≅between X and Y (14.1p)

*Example 18*

1700 parts by weight of refined talloil and 82 parts by weight of maleic acid anhydride and 8 parts by weight of zinc dust are heated to 285° C. for a two hour period and are then cooled to 140° C., whereupon 240 parts by weight of pentaerythritol and 48 parts of a mutually inert solvent are aded. The mixture is esterified in a 13 hour period at temperatures between 260° and 290° C. until an acid number of 14.6 is reached. The resin solution is reacted separately with each of the monomeric mixtures set forth below:

|  | 18A | 18B | 18C | 18D | 18E | 18F |
|---|---|---|---|---|---|---|
| Acrylonitrile, parts by weight | 8 | 4 | 12 | 16 | 12 | 4 |
| Styrene, parts by weight | 32 | 16 | 48 | 64 | 48 | 46 |

In each of the above instances, the monomers were added gradually to 200 parts by weight of the resin, which had been diluted with a mutually inert solvent as shown below:

|  | 18A | 18B | 18C | 18D | 18E | 18F |
|---|---|---|---|---|---|---|
| P-1 ink oil, parts by weight | 55 | 41.5 | 68.5 | 81.5 |  |  |
| Varsol #1, parts by weight |  |  |  |  | 68.5 | 62.5 |

Additionally, each of the examples set forth above contained the following: 0.5 part by weight of zinc dust, 1 part by weight of carbitol, 0.5 part by weight of acetone, 0.5 part by weight of cobalt naphthenate in P-1 ink oil, (containing 1.2% cobalt), 3 parts by weight of cumene hydroperoxide. Each of these mixtures are stirred at 55°–58° C. during the gradual addition of the monomers over a 15 minute period. Each batch is then stirred for a one-half hour period at 55–60° C. Then the temperatures are gradually raised in a 5 hour period to the top temperature (usualy determined by the reflux of the monomers and the solvent). These top temperatures for each batch are as hereinbelow set forth:

|  | 18A | 18B | 18C | 18D | 18E | 18F |
|---|---|---|---|---|---|---|
| Top Temperature, °C | 233 | 246 | 242 | 249 | 174 | 178 |

After reaching the top temperature, the batches are diluted with sufficient quantities of a mutualy inert solvent (a high boiling aliphatic hydrocarbon) until the desired viscosities are attained. These viscosities varied from S to Z10 on the Gardner-Holdt scale.

By then evaporating the solvents from films of these resinous solutions, the following characteristics of the resin films are observed: all of the resins were non-tacky and varied in hardness, the degree of hardness increasing in direct proportions with the increased amounts of the monomeric acrylonitrile and the monomeric styrene present in the resins. Nothwithstanding their hardness, these dry resins are not brittle. The resin solutions 18C, 18E and 18F are turbid but they can be diluted with a high boiling aliphatic petroleum such as P-1 ink oil or Varsol #1 portions of one to five without causing separation of the resin from the solution. Further characteristic features of 18C, 18E, and 18F in a 60% solid resin solution are their high viscosities and gel-like consistencies. In this respect, they resemble wax compounds and are utilizable in a broad field of applications.

The acrylonitrile and the styrene used in the prepartion of each of these resins and resin solutions is the monomeric form.

The total amount of these monomers in relation to the total amount of resin solution finally produced may be varied considerably, but it has been found that the range of percentages of the total weight of monomers based on the total weight of the resin should be between 5–35% with a range of 10–20% preferred. Of this, some acrylonitrile must be present. The percentage range of the acrylonitrile present based on the total weight of the resin may vary between 1–25% with 2–8% preferred. The range of percentages of styrene present may be varied between 2–34% with 2–18% preferred. For certain usages the resins can be prepared by use of acrylonitrile alone, and no styrene. When acrylonitrile is used without styrene, the percentage range may vary between 4–28% with 4–10% preferred.

In the process of treating the talloil with the polycarboxylic acids and the subsequent treatment with the polyhydric alcohols, it is desirable to perform the process in the presence of a refluxing solvent with constant stirring. The subsequent addition of the acrylonitrile or the acrylonitrile and the styrene to the talloil modified alkyd resins is performed with constant stirring, so as to blend the mixture into a homogeneous mass and the subsequent heating is performed under reflux and again constant stirring is to be desired.

The mol ratios between the talloil and the polybasic acid and the polyhydric alcohol can be varied widely depending on the characteristics desired in the ultimate resin. By using less polycarboxylic acid, the final resin is softer and by the same token, the reverse is true; by the use of more polycarboxylic acid, the resulting resin is harder. The amount of the polyhydric alcohol that can be added varies considerably but depends on the amount of polycarboxylic acid used and depends on the acid number of the resin which is desired for a particular application. The acid number at the end of the esterification step should be between 5–35 with an acid number between 10–20 preferred. In most instances, however, particularly where a low acid number of the alkyd resin is required, 5 to 10% in excess of the stoichiometrical amounts of the polyhydric alcohol calculated to react completely with the talloil, polycarboxylic acid adduct or mixture is generally used. It is possible, however, in the addition of the polyhydric alcohol to use the theoretical stoichiometrical amount, or even less than this, particularly when softer resins are desired. In the instance of pentaerythritol only 5% in excess of the stoichiometrical amounts is generally necessary for the completion of the reaction; whereas, in the use of ethylene glycol and glycerol generally 10% in excess is required. One of the preferred embodiments of the mol ratio is, however, in the use of between 4 to 6 molar acid equivalents of refined talloil and between 1 to 3 mols of the polycarboxylic acids. The mol ratio of the polyhydric alcohol to be added can be varied as indicated above depending on the type of resin desired.

By allowing the polyhydric alcohol to react with the talloil polycarboxylic acid adduct or mixture until a relatively low acid number has been reached, namely, between 5 and 35, a talloil modified alkyd resin is produced which when treated with the acrylonitrile alone or with the acrylonitrile and the styrene conjunctively, produces a resultant resin which is soluble in high boiling aliphatic petroleum hydrocarbons of low kauri-butanol value. These high boiling aliphatic petroleum hydrocarbons of low kauri-butanol value are P-1 ink oil and P-2 ink oil, deodorized petroleum solvent No. 590, deodorized petroleum solvent No. 470, Varsol No. 1, to name a few. The kauri-butanol values and other physical factors relating to the boiling points of these petroleum hydrocarbon fractions are shown below:

| | Kauri-Butanol Value | Initial Boiling Point | 5% | 95% | A.S.T.M. E.P. |
|---|---|---|---|---|---|
| | | °F. | °F. | °F. | °F. |
| American Petroleum: | | | | | |
| P-1 ink oil | 25.0 | 460 | 470 | 501 | 530 |
| P-2 ink oil | 22.6 | 513 | 521 | 555 | 565 |
| Magee Bros. Chicago, Ill.: | | | | | |
| Deodorized Petroleum Solvent #590 | 20.2 | 590 | 596 | 627 | 636 |
| Deodorized Petroleum Solvent #470 | 23 | 467 | 474 | 499 | 519 |
| Varsol #1 | 36–39 | 315 | 10%–334 | 50%–342 90%–367 | 392 |

The kauri-butanol test is applied to solvents in order to ascertain their relative merits as such, and the test is applied as follows: To 20 grams of the kauri-solution in butanol (100 grams of kauri resin dissolved in 500 grams of butanol) are added, in small increments, the solvent to be tested until turbidity is reached. The number of cc. required to establish this end point is the kauri-butanol value or the kauri-butanol number for the particular solvent tested. (See Physical and Chemical Exam. of Paints, Varnishes, Lacquers, and Colors. Henry A. Gardner and G. G. Sward, May 1946.)

The method of adding the polycarboxylic acid and the polyhydric alcohol to the talloil need not be accomplished in successive steps. Actually, the acid and the alcohol can be added simultaneously to the talloil and the reaction to form the talloil modified alkyd resin can be produced by this alternative procedure. In certain instances, such as when the α,β unsaturated polycarboxylic acids are used, it is more desirable to react the polybasic acid with the talloil prior to the subsequent esterification by the polyhydric alcohol.

Cobalt in the form of cobalt naphthenate may be advantageously added to the resin solution, particularly if such resin solution is to be used in the preparation of paints and lacquers. The addition of cobalt naphthenate increases the drying effect of the resins when they are used as a vehicle, in such applications as in paints, varnishes, lacquers, etc.

The term "acid number" with respect to these alkyd resins has been used from time to time in the course of the specification. The acid number of a resin is defined as the number of milligrams of potassium hydroxide which are required to neutralize 1 gram of the resin. The reaction of the polyhydric alcohols with the talloil-polycarboxylic acid adduct or mixture can be permitted to proceed until any desired acid number is reached; but as it has been previously pointed out, for these particular resins, an acid number range between 5 and 35 is desired, and a range of between 10 and 20 is preferred.

The viscosities of these resin solutions vary somewhat with the different solvents used. It is to be further noted that the lower the kauri-butanol value of the solvent is, the more viscous is the solution produced. The viscosity of a 50% resin solids solution (in a high boiling aliphatic petroleum hydrocarbon) in the esterification step should be between C and L on the Gardner-Holdt scale with H to L preferred. After the addition of the monomers, the viscosities of these resin solutions (containing 60% resin solids) is preferably between about K and Z–10, with optimum results acquired, for pigments other than carbon black, between the ranges of T and Z–5 on the Gardner-Holdt scale. When carbon black is the pigment used in the printing ink, optimum results are acquired when the viscosity is within the range of Z to Z–2 on the Gardner-Holdt scale.

It is to be noted that certain resins cannot be dissolved in these high-boiling aliphatic hydrocarbons of low kauri-butanol value. But the resins prepared according to the process shown in this invention are soluble in these hydrocarbon solvents. When I refer to a high-boiling aliphatic solvent of low kauri-butanol value, I mean a solvent which has a kauri-butanol value between 16 and 50, but preferably between 20 and 40.

In the preparation of these resin solutions, it is imperative that the talloil, either crude or refined, be used. The use of the other types of vegetable, fish, and mineral oils will not produce the unusual and unexpected results that are realized by the use of the talloil. This may be at least partially due to the fact that the talloil has a composition comprising not only a substantial proportion of the fatty acids, but also a substantial proportion of the resin acids. I have discovered that the unique mixture contained in the talloil produces the unusual and unexpected result.

In the use of the resins such as those prepared according to Examples 18C, D, and E, it has been pointed out that the characteristic features of the 60% resin solutions prepared according to the above examples, are their high viscosities and their gel-like consistencies. In this respect, these resin solutions resemble wax compounds, which are dispersions of wax in a vehicle, which vehicle is usually a light-bodied drying oil. These resins are used to considerable advantage in "shortening" printing inks to prevent tacky inks from forming stringy or thread-like formations during the process of transfer from roller to roller, and finally to the printable object. These "long" inks are responsible for the fly-specking of the web. Due to the wax-like characteristics of these three high viscosity resin solutions, they may be used in place of wax compounds to "shorten" long inks and improve their printing characteristics.

In a "dry" content determination run for ½ hour at 230° F., the dry resin of Example 18E is hard and non-tacky after cooling, while that of Example 18F remains slightly tacky. Although both resins were reacted with the same proportion of the monomers. Example 18E showed the beneficial effect of an increased ratio of acrylonitrile in the combined monomers.

In the preparation of these talloil modified alkyd resins, it is important that the viscosity of the talloil alkyd resin, prior to the treatment with the monomeric acrylonitrile, or the monomeric acrylonitrile and the monomeric styrene, be controlled at a value less than M, because the resin thus produced, when later reacted with the monomers, produces a vehicle which has excellent wetting properties for carbon-black. During the esterification of the talloil polybasic acid adduct, if the viscosity is allowed to become greater than M, the subsequent vehicle, produced by the reaction of the monomers and the subsequent dissolving into the high-boiling petroleum hydrocarbon of low kauri-butanol value, has poorer wetting properties for the carbon-black.

The following examples serve to show in further detail the preparation of these printing inks by use of these ink vehicles prepared according to the examples set forth above. It is to be noted, however, that the specific enumeration of detail is by way of illustration only and is not to be interpreted as a limitation on the case except as indicated by the appended claims.

*Example 19*

For the preparation of a heat-setting black, letter-press typographic printing ink, take 20 parts by weight of carbon black (No. H–140 Binney & Smith), 60 parts by weight of the resin prepared according to Example 8, and 20 parts by weight of the inert solvent (P–1 ink oil). This mixture is blended to produce an ink which has excellent flow. It sets immediately if exposed to the high temperatures of the Selas Burner Chambers.

*Example 20*

A heat-setting yellow ink can be prepared by mixing the following ingredients: 25 parts by weight of benzidine yellow pigment, 70 parts by weight of the resinous solution prepared according to Example 8, and 8 parts by weight of P–1 ink oil, and 2 parts by weight of cobalt naphthenate in P–1 ink oil containing 6% by weight of cobalt. The ink produced according to Example 2 has excellent flow but it must be noted that usually inks made with only 20% of benzidine yellow are stiff pastes with no flow. The printing ink prepared according to this example may be set to dry on printed films upon exposure to heat as applied under the heat-setting conditions.

*Example 21*

A lithographic black ink was prepared by mixing and milling the following ingredients: 20 parts by weight of carbon black (H–140°), 68 parts by weight of the vehicle prepared according to Example 8, 8 parts by weight of P–1 ink oil, 2 parts by weight of cobalt naphthenate in P–1 ink oil, containing 6% of the cobalt, 2 parts by weight of a 25% bleached carnauba wax in vehicle as prepared according to Example 8. The resulting ink was run on a lithographic press. It showed sharpness in reproduction and fast-drying when exposed to heat.

*Example 22*

An intaglio printing ink may be prepared as follows: 12 parts by weight of carbon black, 1.5 parts by weight of a 33⅓% solution of methyl violet dye in oleic acid, 12 parts by weight of P–1 ink oil, 42 parts by weight of the resin vehicle prepared according to Example 18A, .666 part by weight of a solution of cobalt naphthenate (containing 6% by weight of cobalt) in Varsol No. 1, .667 part by weight of a solution of manganese naphthenate (containing 6% by weight om manganese) in Varsol No. 1, .667 part by weight of a solution of lead naphthenate (containing 24% of lead) in Varsol No. 1. These ingredients are mixed and then milled into a smooth homogeneous paste on a three roller mill. The paste is thinned with 25 parts by weight of xylol. The resulting ink is "short in body" (e. g. it has pronounced anomalous properties—it is very thixotropic), and it still has sufficient flow to fill up the etched-in portions or recessed in a photogravure copper plate.

If it is desirable to make the ink "shorter," part or all of the vehicle prepared according to Example 18A may be replaced by the vehicle prepared according to Example 18C. Alternatively, to make the ink "shorter" more carbon black pigment may be used. If more flow is desirable, less carbon black may be used or the vehicle prepared according to Example 18B may be substituted for the vehicle prepared according to Example 18A.

The ink prepared with the resin vehicle in Example 18A is suitable for the slower sheet-fed gravure printing processes. For the faster web-fed rotogravure printing processes a vehicle similar to that prepared according to Example 18A with the thinner replaced by Varsol No. 1 or a more volatile hydrocarbon could be used. If faster drying rotogravure inks are desired the vehicles prepared according to Examples 18E or 18C would be found to be suitable.

Sometime reformulation might be necessary depending on the oil absorption of the pigment used. Neospectra Mark II carbon black is one of the inexpensive carbon black pigments which is readily usable. Other pigments, however, may be used with the same vehicle as indicated in Example 22 or with similar vehicles prepared according to the examples set forth above. If the printing ink vehicle is to be used for lighter colors the resin per se should be prepared with refined tall oil.

It should be noted that the resin solution used as a vehicle in Example 22 could be substituted by that vehicle prepared by Example 17C. By the same token the vehicle prepared according to Examples 17A and 17B may be substituted in the place of Example 18C. Furthermore, the vehicle prepared according to Example 17D may be used to replace the vehicle prepared according to Example 18B.

It will be obvious to one skilled in the art that each of these resins in solution can be adapted as vehicles to a particular printing process by slight modification when and as necessary.

These resin vehicles may be utilized in the following printing processes: off-set, intaglio, lithographic, heat-setting, typographic, gravure and the like.

The viscosity of these tall oil modified alkyd resins in a 60% solids solution should be between Z and Z—2 on the Gardner-Holdt scale. Viscosities of lower values, such as X and Y, are also good, but the drying qualities of the inks used with these lower viscosity vehicles is not as good as those inks prepared with the vehicle having a viscosity between Z and Z—2. The hardness of the resultant ink increases directly with the viscosity; but as the viscosity is increased, the wetting properties for the carbon-black drop off. However higher viscosities, i. e. above Z—2, are suitable for use with other pigments.

A lithographic, heat-setting press, as now used, can turn out about 600 feet of printed matter per minute; but with this new vehicle, a speed of between 1000 and 1400 feet per minute can be attained. In order to accomplish this running speed of between 1000 and 1400 feet per minute, it is necessary that the paper be capable of drying in 0.6 of a second after the printing is imposed thereon.

In the utilization of these vehicles, it is most desirable to use the P—1 ink oil or other comparable solvents that have a low kauri-butanol value. Most resins are not compatible with these

What is claimed is:

1. A printing ink comprising a vehicle which comprises the heat reaction product of monomeric styrene and monomeric acrylonitrile, with a tall oil-modified alkyd resin, wherein the total monomers present is within the range of 5%-35% by weight and wherein the total amount of monomeric styrene is 2%-34% and the total amount of monomeric acrylonitrile is 1-25% by weight based on the total weight of said resin dissolved in a high-boiling petroleum hydrocarbon of low kauri-butanol value, and pigment.

2. A printing ink comprising a vehicle which comprises the heat reacton product of monomeric styrene and monomeric acrylonitrile, with a tall oil-modified maleic acid anhydride pentaerythritol resin, wherein the total monomers present is within the range of 5%-35% by weight and wherein the total amount of monomeric styrene is 2%-34% and the total amount of monomeric acrylonitrile is 1-25% by weight based on the total weight of said resin dissolved in a high-boiling petroleum hydrocarbon of low kauri-butanol value, and pigment.

3. A printing ink comprising a vehicle which comprises the heat reduction product of monomeric styrene and monomeric acrylonitrile, with a tall oil-modified phthalic acid anhydride glycerol resin, wherein the total monomers present is within the range of 5%-35% by weight and wherein the total amount of monomeric styrene is 2%-34% and the total amount of monomeric acrylonitrile is 1-25% by weight based on the total weight of said resin dissolved in a high-boiling petroleum hydrocarbon of low kauri-butanol value, and pigment.

4. A printing ink comprising a vehicle which comprises the heat reaction product of monomeric styrene and monomeric acrylonitrile, with a tall oil-modified alkyd resin dissolved in a high-boiling petroleum hydrocarbon of low kauri-butanol value and pigment and in which said monomers constitute between 10-20% by weight, said styrene constitutes between 2%-18% by weight and said acrylonitrile constitutes 2%-8% by weight based on the total weight of the resin.

5. A printing ink comprising a vehicle which comprises the heat reaction product of monomeric acrylonitrile with a tall oil-modified phthalic acid anhydride glycerol resin dissolved in a high-boiling petroleum hydrocarbon of low kauri-butanol value, and pigment wherein said acrylonitrile constitutes between 4%-28% by weight based on the total weight of said resin.

6. A printing ink comprising a vehicle which comprises the heat reaction product of monomeric acrylonitrile with a tall oil-modified fumaric acid anhydride ethylene glycol resin dissolved in a high-boiling petroleum hydrocarbon of low kauri-butanol value, and pigment wherein said acrylonitrile constitutes between 4%-28% by weight based on the total weight of said resin.

7. A printing ink comprising a vehicle which comprises the heat reaction product of monomeric acrylonitrile with a tall oil-modified alkyd resin dissolved in a high-boiling petroleum hydrocarbon of low kauri-butanol value, pigment, and in which said acrylonitrile constitutes between 4 and 28% of the total weight of the resin.

8. A printing ink comprising a vehicle which comprises the heat reaction product of monomeric acrylonitrile with a tall oil-modified alkyd resin dissolved in a high-boiling petroleum hydrocarbon of low kauri-butanol value, pigment, and in which said acrylonitrile constitutes between 4 and 10% of the total weight of the resin.

9. A printing ink comprising a vehicle which comprises the heat reaction product of monomeric acrylonitrile with a tall oil-modified alkyd resin dissolved in a high-boiling petroleum hydrocarbon with a kauri-butanol value of between 16 and 50, and pigment wherein said acrylonitrile constitutes between 4%-28% by weight of the total weight of said resin.

ALFRED F. SCHMUTZLER.

REFERENCES CITED

The following references are of record in the file of this patent:

UNITED STATES PATENTS

| Number | Name | Date |
|---|---|---|
| 2,039,243 | Krzikalla et al. | Apr. 28, 1936 |
| 2,252,399 | Durant | Aug. 12, 1941 |
| 2,305,224 | Patterson | Dec. 15, 1942 |
| 2,369,689 | Robie et al. | Feb. 20, 1945 |
| 2,443,735 | Kropa | June 22, 1948 |
| 2,503,772 | Rust | Apr. 11, 1950 |
| 2,514,389 | Glick | July 11, 1950 |

OTHER REFERENCES

Burrell et al.: Paint Oil and Chem. Review, December 14, 1944, pp. 14, 16, 18, 20, and 23.

Paint Oil and Chem. Review, November 11, 1948, pp. 42 and 44-46.